United States Patent [19]

Peiffer et al.

[11] Patent Number: 4,942,189

[45] Date of Patent: * Jul. 17, 1990

[54] INTERFACIAL VISCOSIFICATION OF AQUEOUS SOLUTIONS UTILIZING INTERPOLYMER COMPLEXEX

[75] Inventors: Dennis G. Peiffer, East Brunswick; Robert D. Lundberg, Bridgewater; Ilan Duvdevani, Leonia, all of N.J.

[73] Assignee: Exxon Research and Engineering Company, Florham Park, N.J.

[ * ] Notice: The portion of the term of this patent subsequent to Feb. 5, 2002 has been disclaimed.

[21] Appl. No.: 387,184

[22] Filed: Jul. 31, 1989

Related U.S. Application Data

[63] Continuation of Ser. No. 116,054, Nov. 2, 1987, abandoned.

[51] Int. Cl.$^5$ .......................... C08K 3/00; C08K 5/52; C08K 53/00
[52] U.S. Cl. ................................. 523/339; 523/337; 524/140; 524/147; 524/210; 524/376; 524/378; 524/389; 524/390; 524/505; 524/516; 524/924
[58] Field of Search ............... 524/389, 475, 501, 516; 523/339, 337

[56] References Cited

U.S. PATENT DOCUMENTS 4,497,923 2/1985 Lundberg et al. .................. 524/516

4,647,603 3/1987 Lundberg et al. .................. 524/516

*Primary Examiner*—Joseph L. Schofer
*Assistant Examiner*—Mark D. Sweet
*Attorney, Agent, or Firm*—Richard E. Nanfeldt

[57] ABSTRACT

The present invention relates to a process for the viscosification of an aqueous liquid which includes the steps of forming a solvent system of an organic liquid or oil and a polar cosolvent, the polar cosolvent being less than about 15 weight percent of the solvent system, a viscosity of the solvent system being less than about 1,000 cps; forming an interpolymer complex of neutralized sulfonated polymer (water insoluble) and copolymer of styrene/vinylpyridine in the solvent system to form a solution, a concentration of the water insoluble interpolymer complex polymer in the solution being about 0.01 to about 0.5 weight percent, a viscosity of the solution being less than about 200 cps; the admixing or contacting said solution with about 5 to about 500 volume percent water, the water being immiscible with the organic liquid and the polar cosolvent and interpolymer complex transferring from the organic liquid to the water phase, thereby causing the water phase to gel (i.e., thicken). The large increase in viscosity of the aqueous phase is directly attributed to the formation of a large number of minute water-filled particles dispersed in the continuous aqueous phase.

17 Claims, No Drawings ns using a solution of interacting polymers dissolved at low concentrations (0.01

INTERFACIAL VISCOSIFICATION OF AQUEOUS SOLUTIONS UTILIZING INTERPOLYMER COMPLEX

This is a continuation of application Ser. No. 116,054, filed Nov. 22, 1987, now abandoned.

BACKGROUND OF THE INVENTION

1. Field of the Invention

The present invention relates to a process for the viscosification of an aqueous liquid which includes the steps of forming a solvent system of an organic liquid or oil and a polar cosolvent, the polar cosolvent being less than about 15 weight percent of the solvent system, a viscosity of the solvent system being less than about 1,000 cps; forming an interpolymer complex of neutralized sulfonated polymer (water insoluble) and copolymer of styrene/vinylpyridine in the solvent system to form a solution, a concentration of the water insoluble interpolymer complex polymer in the solution being about 0.01 to about 0.5 weight percent, a viscosity of the solution being less than about 200 cps; and admixing or contacting said solution with about 5 to about 500 volume percent water, the water being immiscible with the organic liquid and the polar cosolvent and interpolymer complex transferring from the organic liquid to the water phase, thereby causing the water phase to gel (i.e., thicken). The large increase in viscosity of the aqueous phase is directly attributed to the formation of a large number of minute water-filled particles dispersed in the continuous aqueous phase.

2. Description of the Prior Art

There are many applications for very viscous or gelled solutions of polymers in water which are quite diverse. There are also a number of physical and chemical techniques for preparing such systems The present invention is concerned with a process for gelling an aqueous system by contacting the aqueous system with a relatively low viscosity, organic liquid solution of an interpolymer complex. The potential applications for this process and the products derived therefrom will be evident in the instant application. Some of these applications are as a viscosifier for aqueous solutions; for viscosification of aqueous acid and inorganic salt solutions; as a fluid loss additive, in enhanced oil recovery; as a viscous foamer in oil well applications; as a water-shut-off means in oil well applications; as a spacer and soluble pig in oil well applications; and as a friction reducer in transferring liquid through a pipe.

The instant invention differs from a number of patents, U.S. Pat. Nos 4,361,658, 4,322,329 and 4,282,130, filed by Robert D. Lundberg, one of the instant inventors, et al. These previously-filed applications were directed to the gelling of the organic liquid by a water insoluble, neutralized sulfonated polymer, whereas the instant invention is directed to the gelling of an aqueous phase. Quite unexpectedly, it has been discovered that when the concentration of the interpolymer complex in solution is maintained in a critical concentration range of 0.01 to 0.5 weight percent of the total volume of solvent, which is a mixture of non-polar organic liquid and a polar cosolvent, is agitated with an aqueous solution a transfer of the polar solvent and water insoluble interpolymer complex from the organic liquid phase to the water phase occurs. The water insoluble interpolymer complex causes the water phase to gel, wherein the interpolymer complex is insoluble in the water phase In the previously-filed patent applications substantial viscosification of the non-polar organic liquid phase did not occur until the concentration of the neutralized sulfonated polymer was sufficiently high enough to permit chain entanglement of adjacent polymer molecules, thereby completely filling the solvent space. The gelation of the aqueous phase of the instant invention does not occur by this previously described mechanism because the resultant concentration of water insoluble, interpolymer complex is not sufficiently high enough to permit chain entanglement. The mechanism of gelation of the aqueous phase, as defined in the instant invention, occurs by the formation of macroscopic, spherical polymer membranes or films dispersed throughout the aqueous fluid (i.e., interfacial viscosification) wherein large volumes of the water of the aqueous liquid are encapsulated within a series of minute polymer bags.

The instant invention describes a process which permits (1) the preparation of polymer solution mixture of two or more interacting polymers in organic liquid having reasonably low viscosities (i.e., less than about 200 cps); and (2) the preparation of extremely viscous solutions or gels of an aqueous fluid from such solutions by a process of mixing or contacting water with the polymer solution mixture. These operations are achieved by the use of the appropriate concentration, 0.01 to 0.5 weight percent of water insoluble interpolymer complex, having low concentrations of interacting groups present, preferably metal sulfonate groups and amine-containing groups. The former polymers are described in detail in a number of U.S. patents (U.S. Pat. Nos 3,836,511, 3,870,841, 3,847,854, 3,642,728 and 3,921,021), which are herein incorporated by reference. These polymers possess unusual solution characteristics, some of which are described in U.S. Pat. No 3,931,021. Specifically, these polymers, such as lightly sulfonated polystyrene, containing about 2 mole percent sodium sulfonate pendant to the aromatic groups, are typically not soluble in solvents commonly employed for polystyrene itself. However, the incorporation of modest levels of polar cosolvents permit the rapid dissolution of such ionic polymers to form homogeneous solutions of moderate viscosity.

The polymers containing the basic moieties, such as amine groups, are readily soluble in solvents commonly employed for polystyrene itself. In addition, these materials are soluble in solutions containing modest levels of polar cosolvents. More specifically, these polymers, such as styrene-4-vinylpyridine copolymers, contain up to about 15 mole percent 4-vinylpyridine attached to the chain backbone.

In the instant process the role of the polar cosolvent is that of solvating the ionic groups in order to prevent strong association or interaction of the sulfonate groups with the base-containing polymer while the main body of the solvent interacts with the polymer backbone. For example, xylene is an excellent solvent for the polystyrene backbone and when combined with 5% methanol will dissolve, readily and rapidly, the mixture of lightly sulfonated polystyrene and styrene-4-vinylpyridine copolymer to form a relatively low viscosity fluid system. Removal of the polar cosolvent permits interpolymer interactions to occur, resulting in a large viscosity increase.

The remarkable and surprising discovery of the instant invention is that when small (or large) amounts of water are combined and mixed with solutions of interacting polymers dissolved at low concentrations (0.01 to 0.5 weight percent) in such mixed systems as those described above a phase transfer of the water insoluble, interpolymer complex and cosolvent occurs from the non-polar organic liquid phase to the water phase, wherein the water insoluble, interpolymer complex causes the water phase to gel. That is, the aqueous phase is found to contain a large number of minute water-containing particles (normally spheres) dispersed in the continuous aqueous phase. These particles significantly contribute to the marked increase in viscosity. Indeed, it is possible to achieve increases in viscosity of the water phase by factors of $10^3$ (1,000) or more by the addition of only 5 to 15% water, based on the polymer solution volume. This unusual behavior is postulated to arise from the removal of the polar cosolvent and water insoluble, interpolymer complex from the organic liquid phase into the separate aqueous phase which then gels, i.e., formation of large numbers of minute, water-filled particles in the continuous aqueous phase.

It should be noted that we have shown (U.S. patent application Ser. Nos. 374,197, 374,198 and 374,251) that sulfonated EPDM and sulfonated polystyrene are very effective as viscosifiers of aqueous systems even though these polymers are soluble only in hydrocarbon solvents (with the aid of a polar cosolvent, such as methanol). We have found that if a dilute hydrocarbon solution (typically 1 g/l or less) containing sulfonated polymer is mixed with water phase separation of the two phases occurs upon standing. Only a small amount of polymer remained in the hydrocarbon solvent, while the majority of the polymer is found in the aqueous phase. Specifically, the aqueous phase contains a large number of small water droplets surrounded by a sulfonated polymer membrane. Unsulfonated polymer produces only a classical phase separation. When the proper volume ratio of hydrocarbon to water is used the aqueous phase becomes completely filled with these spheres. Approximately ten percent of the hydrocarbon solvent is entrapped in the aqueous phase, undoubtedly within the polymer membrane, and also within the sphere itself. Based on previously available information it appears that the sulfonated polystyrene is a more effective viscosifier than sulfonated PEDM, which can be attributed to the higher sulfonation level of the former, as compared to the latter, material.

An important aspect of this instant invention relates to the use of these systems, formed via interpolymer complexes, in aqueous solutions containing large concentrations of acid or salt. The previously described systems, U.S. Ser. Nos. 374,198 and 374,251, using sulfonated polystyrenes, lose their effectiveness in water, but are enhanced in acid-containing water. More specifically, it was found that only the combination of a suitable nonionic surfactant with sulfonated polystyrene gives formulations which are effective in producing these water-in-water pseudo emulsions in high concentrations of salt water. In acidic solutions the nonionic surfactant is not needed for stability (25° C.); however, the viscosity of these systems tends to increase significantly with the addition of small amounts of the non-ionic material (typically <0.04 g/l). The system formed with interpolymer complexes has improved stability in both acid and salt solutions; therefore, it is not necessary to utilize a non-ionic surfactant in these instances.

The mechanism through which the family of interpolymer complexes is operative is not totally understood. The preferred species of these materials is lightly sulfonated polystyrene possessing a sulfonated level from approximately 2 mole percent up to at least 6 mole percent, based on present data and amine-containing copolymers, especially styrene-4-vinylpyridine copolymers containing up to moderate levels of base, i.e., <15 mole percent 4-vinylpyridine. It is readily apparent that sufficient hydrophobic and hydrophilic character has to exist within the molecular structure of these interpolymer complexes for the occurrence of interfacial activity. As a consequence of this "interfacial" activity the interpolymer complexes extremely effective viscosifiers, due essentially to the formation of macroscopic geometrical structures (i.e., spheres). An appropriate term for these structures is water-in-water pseudo-emulsion or water-in-water suspension.

SUMMARY OF THE INVENTION

The present invention relates to a process for the gelation of an aqueous liquid, which includes the steps of forming a solvent system of an organic liquid or oil in a polar cosolvent. The polar cosolvent is less than about 15 weight percent of the solvent system with a viscosity of the solvent system being less than about 100 cps; subsequently forming a solution of an interpolymer complex of neutralized sulfonated polymer and a copolymer of styrene/vinylpyridine in the solvent system to form a solution with a concentration of the interpolymer complex in the solution being about 0.01 to about 0.5 weight percent, the viscosity of the solution being less than about 200 cps; admixing or contacting said solution with about 5 to about 500 volume percent water, the water being immiscible with the organic liquid; and the polar cosolvent and interpolymer complex transferring from the organic liquid to the water phase, thereby causing the water phase to gel (i.e., thicken).

Accordingly, it is a primary object of the instant invention to describe an economical process for forming a highly viscous or gelled aqueous solution having a viscosity from about 50 to about 1,000 cps, the initial viscosity of the aqueous phase being less than approximately 2 cps.

A further object of the instant invention is to provide a process for forming a thickened solution, which can be used as a viscosifier for aqueous systems, aqueous salt systems or aqueous acid systems, and friction reducers for controlling the flow of aqueous fluid through a pipe.

A still further object of the instant invention is to employ the instant process as an integral part of well control procedures, such as enhanced oil recovery, water shut-off means, viscous foams and spacers and soluble pigs.

GENERAL DESCRIPTION

The present invention relates to a process for the thickening or viscosification of an aqueous liquid which includes the steps of forming a solvent system of an organic liquid or oil and a polar cosolvent, the polar cosolvent being less than about 15 weight percent of the solvent system, with a viscosity of the solvent system being less than about 100 cps; subsequently forming a solution of an interpolymer complex of a neutralized sulfonated polymer and a copolymer of styrene/vinylpyridine in the solvent system to form a solution with a concentration of the interpolymer complex in the solution being about 0.01 to about 0.5 weight percent, the viscosity of the solution being less than about 200 cps; admixing or contacting said solution with about 5 to about 500 volume percent water, the water being immiscible with the organic liquid; and the polar cosolvent and interpolymer complex transferring from the organic liquid to the water phase, thereby causing the water phase to gel. The organic layer is separated from the gelled water phase by typical extraction methods. That is, the aqueous phase is found to contain a large number of minute water-containing particles dispersed in the continuous aqueous phase. These particles are the primary reason for the marked increase in viscosity. All viscosities in the instant invention are measured at a shear rate of less than 100 sec$^{-1}$ and at a temperature of 25° C. to 75° C.

The thickened aqueous phase, having a viscosity greater than 50 cps, is formed by the addition of water to a water insoluble solution which comprises a water insoluble interpolymer complex, a nonpolar organic liquid, and a polar cosolvent, wherein the solution has a viscosity less than 200 cps. The concentration of interpolymer complex in the solution is 0.01 to 0.5 weight percent. Upon the addition of water to the solution the polar cosolvent and water insoluble interpolymer complex rapidly transfer from the solution to the aqueous water, which undergoes immediate thickening. The nonpolar organic liquid can be removed from the solution system by conventional liquid extraction methods. The formation of the aqueous fluid or water having a viscosity of at least 50 cps from the organic solution having a viscosity less than 200 cps can be quite rapid, on the order of less than one minute to about 24 hours, more preferably less than one minute to about 30 minutes, and most preferably less than one minute to about ten minutes, however, this depends on temperature, shear, solvent type, etc.

The component materials of the instant process generally include a water insoluble interpolymer complex at a critical concentration level of 0.01 to 0.5 weight percent, a nonpolar organic liquid, polar cosolvent and water.

Gelation of an aqueous phase does not occur if one employs a conventional unsulfonated polymer, or a water soluble, neutralized sulfonated polymer, or a styrene-4-vinylpyridine copolymer in place of the water insoluble, interpolymer complex having both ionic groups and basic moieties, but rather only classical phase separation occurs.

In the instant invention the gelation of the aqueous phase occurs by the formation of geometrically shaped spheres of the water insoluble interpolymer complex within the aqueous phase, wherein the water is encapsulated within these geometrically shaped spheres (co called water-in-water pseudo-emulsion). During the process approximately 10 weight percent of the nonpolar organic liquid also transfers to the aqueous phase and is encapsulated within these geometrically shaped spheres.

A second aspect of the instant invention relates to the use of these interpolymer complexes in aqueous systems containing large concentrations of salt or acid, without the use of a suitable nonionic surfactant.

A third aspect of the instant invention relates to the observation that these geometrically shaped spheres are more stable at markedly lower polymer levels than compared to previously described sulfonated ionomers.

A fourth aspect to the instant invention relates to the fact that the interpolymer complexes are more effective thickeners than the previously described sulfonated ionomers under the identical experimental conditions.

In general, the interpolymer complex is formed from the interaction of a water soluble ionomeric polymer and a copolymer of styrene/vinylpyridine The water insoluble ionomeric polymer will comprise from about 4 to about 500 meq. pendant ionomeric groups per 100 grams of polymer, more preferably from 10 to 100 meq. pendant ionomeric groups. The ionic groups may be conveniently selected from the groups consisting of carboxylate, phosphonate and sulfonate, preferably sulfonate groups. In most instances the ionomers utilized in the instant invention are neutralized with the basic materials selected from Groups IA, IIA, IB and IIB of the Periodic Table of Elements and lead, tin and antimony, as well as ammonium and amine counterions. Ionic polymers which are subject to the process of the instant invention are illimitable and include both plastic and elastic polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene and sulfonated elastomers and their copolymers. The preferred polymers of the instant invention are ethylene-propylene terpolymers and polystyrene, wherein polystyrene is most preferred.

Neutralization of the acid form of the sulfonated elastomeric polymer is done by the addition of a solution of a basic salt to the acid form of the sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from antimony, iron, aluminum, lead, or Groups IA, IIA, IVA, VA, VIA, VIIA, VIIIA, IB or IIB of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably transition metal salts, such as zinc acetate. Sufficient metal salt of the carboxylic acid is added to the solution of the acid form of the elastomeric polymer to effect neutralization It is preferable to neutralize at least 95% of the acid groups, more preferably about 98%, most preferably 100%.

We have surprisingly found that a very important factor in determining the strength of the interaction between the amine-containing and the sulfonate-containing polymer is the nature of the counterion. There are, broadly speaking, three major classes of such counterions. The first class, which are less preferred, are those metals of Group IA and Group IIA, which include Li, Na, K, etc., Be, Mg, Ca, etc. We have found that these species do not interact as strongly with amine groups as the more preferred species described below. Those metals are commonly defined as members of the transition elements (see chemical text: *Chemical Principles and Properties*, by M. J. Sienki and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinylpyridine copolymer than does a magnesium or sodium neutralized system. It is for this reason that the transition elements are preferred, with zinc, copper, iron, nickel, mercury, cadmium and cobalt being especially preferred. We also include antimony and lead as suitable cations. Other suitable counterions are titanium, vanadium and chromium.

Neutralization of the cited polymers with appropriate metal hydroxides, metal acetates, metal oxides or ammonium hydroxides, etc. can be conducted by means well known in the art. For example, the sulfonation process as with Butyl rubber containing a small 0.3 to 1.0 mole percent unsaturation can be conducted in a suitable solvent, such as toluene, with acetyl sulfate as the sulfonated agent, such as is described in U.S. Pat. No. 3,836,511. The resulting sulfonic acid derivative can then be neutralized with a number of different neutralization agents, such as sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed, plus 10 percent more to ensure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said ionomeric groups may vary from 0 (free acid form) to greater than 100 mole percent, preferably 50 to 100 percent. With the utilization of neutralized ionomers in this instant invention it is preferred that the degree of neutralization be substantially complete, that is, with no substantial free acid present and without substantial excess of the base other than that needed to insure neutralization. The neutralized ionomers possess greater thermal stability compared to its acid form. Thus, it is clear that the polymers which are normally utilized in the instant invention comprise substantially neutralized pendant groups and, in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art, for example, see U.S. Pat. No 3,642,728, hereby incorporated by reference.

The preferred ionic copolymers for use in the instant invention, e.g., sulfonated polystyrene and substituted derivatives thereof, may be prepared by the procedures described in U.S. Pat. No. 3,870,841, filed Oct. 2, 1972 in the names of H. S. Makowski, et al., hereby incorporated by reference.

Specific examples of preferred ionomeric polymers which are useful in the instant invention include sulfonated polystyrene, sulfonated poly-t-butylstyrene, sulfonated polyethylene (substantially non-crystalline), and sulfonated ethylene copolymers, sulfonated polypropylene (substantially non-crystalline), and sulfonated polypropylene copolymers, sulfonated styrene-methyl methacrylate copolymers, (styrene)-acrylic acid copolymers, sulfonated polyisobutylene, sulfonated ethylene-propylene terpolymers, sulfonated polyisoprene, sulfonated polyvinyl toluene, sulfonated polyvinyl toluene copolymers, sulfonated polyvinyl toluene copolymers and isoprene-styrene sulfone copolymers.

The water insoluble base-containing copolymer will comprise from about 0.1 to 50 weight percent basic groups situated along the chain backbone. The basic groups may be conveniently selected from the groups containing polymerizable primary, secondary and tertiary amine groups. Included in these categories are the pyridine, anilines, pyrroles, amides and other basic polymerizable ammonia derivatives. Specific polymers include styrene-4 vinylpyridine, t-butyl styrene-4-vinylpyridine, ethylene-4-vinylpyridine copolymers, propylene-4 vinylpyridine copolymers, acrylonitrile-4-vinylpyridine, methyl methacrylate-4 vinylpyridine copolymers, block copolymers of ethylene oxide/4-vinylpyridine, acrylic acid-4-vinylpyridine copolymers, ethylene-propylene-4-vinylpyridine terpolymers, isoprene-4 vinylpyridine, 4-vinylpyridine-elastomers, copolymers and the like. The preferred base containing polymers of the instant invention are styrene and 4-vinylpyridine and ethylene-propylene terpolymers with grafted 4-vinylpyridine. The former polymers are the preferred species.

These materials are prepared through conventional solution, suspension and emulsion copolymerization techniques.

The ionomeric polymers and base-containing polymers of the instant invention may be prepared prior to incorporation into the organic solvent, or by neutralization of the acid form in situ. For example, in the case of the sulfonate-containing species preferably the acid derivative is neutralized immediately after preparation. For example, if the sulfonation of polystyrene is conducted in solution then the neutralization of that acid derivative can be conducted immediately following the sulfonation procedure. The neutralized polymer may then be isolated by means well known to those skilled in the art, i.e., coagulation, steam stripping or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ, however, this is not a preferred operation since in situ neutralization requires preparation of the sulfonic acid in the organic liquid which is to be subjected to the instant process or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less the problems in handling polymers of limited thermal stability and maximum control over the final mixture of ionic polymer, polar cosolvent and organic liquid.

The copolymer of styrene/vinylpyridine are typically formed by the emulsion copolymerization of freshly distilled styrene and N-vinylpyridine monomers. This method of copolymerization is generally known to those well versed in the art. As noted previously, solution or suspension techniques may also be used to prepare these base-containing polymeric materials.

The interpolymer complex of the neutralized sulfonated polymer and the copolymer of styrene/vinylpyridine is formed by forming a first solution of the neutralized sulfonated polymer in the previously described solvent system. A second solution of the copolymer of styrene/vinyl pyridine is formed by dissolving the copolymer of styrene/vinylpyridine in an aromatic solvent, such as xylene or benzene. The concentration of the neutralized sulfonated polymer in the solution is about 0.001 to about 0.5 g/dl, more preferably about 0.01 to about 0.45, and most preferably about 0.01 to about 0.4. The concentration of the copolymer of styrene/vinylpyridine in the second solution is about 0.001 to about 0.5 g/dl, more preferably about 0.01 to about 0.45, and most preferably about 0.01 to about 0.4. The first solution of the neutralized sulfonated polymer and the second solution of the copolymer of styrene/vinylpyridine are mixed together, thereby permitting the interaction of the neutralized sulfonated polymer and the copolymer of styrene/vinylpyridine to form the water insoluble interpolymer complex. The molar ratio of neutralized sulfonated polymer to the copolymer of styrene/vinylpyridine in the interpolymer complex is about 0.1 to about 20, more preferably about 0.5 to about 10, and most preferably about 1 to 5.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text *Chemical Principles and Properties* by J. M. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinylpyridine copolymer than does a magnesium or sodium neutralized system. It is for this reason that the transition elements are preferred, with zinc, copper, iron, nickel and cobalt being especially preferred. We also include antimony and lead as suitable cations.

A third species which is preferred is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry (based on small molecule analogs).

A variety of polymer backbones will display the desirable properties discovered in this invention:

| Sulfonate Polymer | Amine Polymer |
| --- | --- |
| Sulfo-EPDM | Styrene/Vinylpyridine Copolymer |
| Sulfonate Isoprene Copolymers | Vinylpyridine/Styrene/ Butadiene Terpolymers |
| Sulfonate SBR Polymers | |
| Sulfonate Butadiene Polymers | Isoprene/Vinylpyridine Copolymer |
| Sulfonated Butyl | Ethylacrylate/Vinyl- |
| Sulfonated Acrylate and Methacrylate Copolymers | pyridine Copolymer and Alkyl Acrylate Copolymers with Vinylpyridine, |
| Sulfonated Block Polymers | where the Alkyl group varies in carbon number from 1 to 18. |
| | Methyl Methacrylate/Vinylpyridine Copolymer and Alkyl Methacrylate Copolymers with Vinylpyridine, wherein the number of carbon groups in the alkyl group varies from 1 to 18 carbon atoms. |
| | Butadiene/Vinylpyridine Copolymer |
| | Propylene/Vinylpyridine Block Copolymer |
| | Ethylene/Vinylpyridine Block Copolymer |
| | t-Butyl Styrene/Vinylpyridine Copolymers |
| | Vinylpyridine Copolymers with alpha-beta ethylenically unsaturated copolymers or terpolymers. |

The amount of vinyl pyridine in the amine-containing polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 grams. A range of 8 to 200 meq. per 100 grams is preferred.

The organic liquids which may be utilized in the instant invention are selected with relation to the ionic polymer and vice versa. The organic liquid is selected from the group consisting essentially of aromatic hydrocarbons, cyclic aliphatic ethers, aliphatic ethers or organic aliphatic esters of organic acids and mixtures thereof.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylendichloride, methylene chloride. |
| sulfonated poly-t-butyl styrene | benzene, toluene, xylene ethyl benzene, styrene, t-butyl styrene, aliphatic oils, aromatic oils, hexane, heptane, decane, nonane. |
| sulfonated ethylene-propylene terpolymer | pentane, aliphatic and aromatic solvents, oils such as solvent "100 Neutral", "150 Neutral" and similar oils, benzene, diesel oil, toluene, |

-continued

| Polymer | Organic Liquid |
|---|---|
| | xylene, ethyl benzene, pentane, hexane, heptane, octane, isooctane, nonane, decane aromatic solvents, ketone solvents. |
| sulfonated styrene-methylmethacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl. |
| ether, methyl oleate | ether, methyl oleate, aliphatic oils, oils predominantly paraffinic in nature and mixtures containing naphthenic hydrocarbons. "Solvent 100 Neutral", "Solvent 150 Neutral" and all related oils, low molecular weight polymeric oils, such as squalene, white oils and process oils having 60% or less aromatic content. |
| sulfonated polyvinyl toluene | toluene, benzene, xylene, cyclohexane, ethylbenzene, styrene, methylene chloride, ethylene dichloride. |

All viscosity measurements made or referred to in this invention were measured at a shear rate of about 1.0 sec.$^{-1}$ at about room temperature. The water insoluble neutralized sulfonated polymers of the instant invention have about 10 to about 100 meq. pendant sulfonate groups per 100 grams of the neutralized sulfonated polymer, more preferably about 10 to about 100, and most preferably about 10 to about 40, wherein water insoluble refers to the neutralized sulfonated polymer and not to the unneutralized sulfonated polymer or to the unsulfonated polymer. The concentration of the interpolymer complex in the final solution is about 0.001 to about 0.45 grams/dl, more preferably about 0.01 to about 0.45, and most preferably about 0.01 to about 0.40. The organic liquids employed in the instant invention have a solubility parameter of less than 10.5. The water employed in the instant invention can be tap water or distilled water, wherein the water can contain up to 1.0 weight percent of acids, bases or salts.

The method of the instant invention includes incorporating a polar cosolvent, for example, a polar cosolvent in the mixture of organic liquid and water insoluble interpolymer complex to solubilize the pendant ionomeric groups. The polar cosolvent will have a solubility parameter of at least 10.0, more preferably at least 11.0, and is water miscible and may comprise from 0.1 to 15.0 weight percent, preferably 0.1 to 5.0 weight percent, of the total mixture of organic liquid, water insoluble ionomeric polymer and polar cosolvent. The solvent system of polar cosolvent and organic liquid in which the water insoluble interpolymer complex is dissolved contains less than about 10 weight percent of the polar cosolvent, more preferably about 0.1 to about 5.0 weight percent, and most preferably about 0.1 to about 5.0 weight percent. The viscosity of the solvent system is less than about 1,000 cps, more preferably less than about 800 cps, and most preferably less than about 500 cps.

Normally, the polar cosolvent will be a liquid at room temperature, however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or trifunctional alcohols, amides, acetamides, phosphates or lactones and mixtures thereof. Especially preferred polar cosolvents are aliphatic alcohols, such as methanol, ethanol, n-propanol, isopropanol, 1,2-propane diol, monoethyl ether of ethylene glycol and n-ethylformamide.

The amount of water added to the solution of water insoluble interpolymer complex, organic liquid and polar cosolvent having a viscosity of less than about 2,000 cps is about 5 to about 500 volume percent of water, more preferably about 10 to about 300 volume percent water, most preferably about 10 to about 200 volume percent water.

DETAILED DESCRIPTION OF THE INVENTION

The following Examples will demonstrate the performance of an interpolymer complex consisting of a sulfonated polystyrene and a styrene-4-vinylpyridine in specific aqueous environments.

EXAMPLE 1

The major observation, as described in previous patent applications, that we observe is that whenever a hydrocarbon solution containing a low concentration of a sulfonated polystyrene or EPDM is mildly agitated with pure water for a short period of time water-filled particles dispersed in a continuous aqueous phase are formed. In the initial formation stage the type of system produced in these systems has an encapsulated aqueous phase, while the hydrocarbon medium is the continuous phase. It is inferred that the sulfonated polymer stabilizes the hydrocarbon/water interface. Upon standing for a short period of time after mixing has occurred it is noted that approximately 90 to 95 percent of the initial hydrocarbon solvent can be easily separated from the system, leaving behind a system characterized as a water-in-water dispersion. These systems are capable of being diluted (i.e., dispersed) with a variety of aqueous solvents. An identical phenomena occurs with the interpolymer complexes. However, the properties of the latter materials are markedly improved over the previously described homogeneously-charged sulfonated polystyrenes.

A 2.5 ml increment of about 0.5 g/dl xylene solution containing a 4-vinylpyridine-(10 mole percent-styrene copolymer was added to 2.5 ml increment of 0.5 g/dl xylene solution containing a 1.7 mole percent sodium neutralized sulfonated polystyrene (SPS). This latter solution contained approximately 2 weight percent methanol in order to allow for complete dissolution of the sulfonated ionomer. The alcohol also inhibited the complete formation of the interpolymer complex. Subsequently, 10 ml of xylene was added to the solution. The total polymer concentration was 0.167 g/dl.

The hydrocarbon solution was agitated with 25 ml of distilled water. The water-in-water dispersion system formed instantaneously. In order to obtain maximum particle packing, 48 hours elapsed prior to the measurement of viscosity. This data is compared to sulfonated polymer water-in-water suspension systems produced under the identical experimental conditions.

Table I confirms the effectiveness of the interpolymer complex as a viscosifier for fresh water systems at room temperature. This data is compared with the 1.7 mole percent sulfonated polystyrene material (SPS).

TABLE I

Viscosity-Shear Rate Behavior of Several Suspension Systems in Fresh Water

| Shear Rate (RPM) | Viscosity, cps (SPS) | Viscosity, cps (Interpolymer Complex) |
| --- | --- | --- |
| 60 | 270 | 580 |
| 30 | 448 | 1,060 |
| 12 | 880 | 2,250 |
| 6 | 1,300 | 4,000 |
| 3 | 2,400 | 7,000 |
| 1.5 | 4,400 | 13,600 |
| 0.6 | 11,000 | 34,000 |

The results show that water-in-water suspensions formed via interpolymer complexes are more effective viscosifiers than sulfonated monomers under the identical conditions. This advantage becomes even more apparent as the shear rate is varied.

EXAMPLE 2

Water-in-water suspension systems were formed as previously described in Example 1, except that the polymer concentration was lowered via standard dilution techniques to 0.033 g/dl. The viscosities of these systems are presented in Table II.

TABLE II

Viscosity-Shear Rate Behavior of Several Suspension Systems in Fresh Water

| Shear Rate (RPM) | Viscosity, cps (SPS)* | Viscosity, cps (Interpolymer Complex) |
| --- | --- | --- |
| 60 | — | 352 |
| 30 | — | 444 |
| 12 | — | 1,070 |
| 6 | — | 2,260 |
| 3 | — | 5,120 |
| 1.5 | — | 10,720 |
| 0.6 | — | 29,600 |

*Water-in-water suspension did not form at this polmer concentration.

The above results show that water-in-water suspensions formed with the interpolymer complex are more stable at markedly lower polymer levels than compared to sulfonated ionomers. Even though the polymer level is less, the viscosity of these systems compares favorably with the viscosity data in Example 1. This is due in large part to the fact that the geometrical size of the individual particle controls viscosity. The thickness of the particle's membrane is not a contributing factor in this regard.

Normally, the viscosity of a homogeneous polymer solution rises rapidly with concentration. However, since the polymer molecules of the interpolymer complex are located in the interfacial region, the viscosity remains remarkably constant. This behavior differentiates interfacial viscosification from classical polymer solution behavior.

EXAMPLE 3

Table III shows the effectiveness of the interpolymer complex (described in Example 2) as a viscosifier for 1.7 molar sodium chloride solutions. As described previously, sulfonate ionomer water-in-water suspensions will not form without a minute amount of nonionic surfactant.

TABLE III

Viscosity-Shear Rate Behavior of Several Suspension Systems in 1.7 Molar Sodium Chloride

| Shear Rate (RPM) | Viscosity, cps (SPS)* | Viscosity, cps (Interpolymer Complex) |
| --- | --- | --- |
| 60 | — | 288 |
| 30 | — | 380 |
| 12 | — | 910 |
| 6 | — | 1,820 |
| 3 | — | 4,200 |
| 1.5 | — | 8,680 |
| 0.6 | — | 24,200 |

*A water-in-water suspension system did not form in this aqueous solution.

Again, the viscosity of these water-in-water suspensions compare favorably with the values shown in Examples 1 and 2.

EXAMPLE 4

Water-in-water suspension systems were formed as previously described in Example 1, except that the polymer concentration was lowered via standard dilution techniques to 0.033 g/dl, utilizing a zinc neutralized sulfonated polystyrene (2 mole percent sulfonation level). The viscosities of these systems are presented in Table IV.

TABLE IV

Viscosity-Shear Rate Behavior of Several Suspension Systems in Fresh Water

| Shear Rate (RPM) | Viscosity, cps (SPS)* | Viscosity, cps (Interpolymer Complex) |
| --- | --- | --- |
| 60 | — | 352 |
| 30 | — | 576 |
| 12 | — | 1,300 |
| 6 | — | 2,700 |
| 3 | — | 5,800 |
| 1.5 | — | 12,400 |
| 0.6 | — | 27,800 |
| 0.3 | — | 50,000 |

Again, the above results show that water-in-water suspensions formed with the interpolymer complex are more stable at markedly lower polymer levels than compared to sulfonated ionomers. Moreover, it appears that the zinc neutralized sulfonated polystyrene salt-complex systems increased the viscosity of the solution to a greater extent than the sodium salt. At the present time the exact mechanism is somewhat obscure, however, the effect is, in part, due to the significantly larger interaction strength of the zinc salt as compared to the sodium slat.

What is claimed is:

1. A process for forming a thickened aqueous fluid having a viscosity of at least 50 cps, which includes the steps of:
    (a) forming a solvent system of a nonpolar organic liquid and a polar cosolvent, said polar cosolvent being less than about 15 weight percent of said solvent system, a viscosity of said solvent system being less than about 100 cps said polar cosolvent being selected from the group consisting of water soluble alcohols, amines, amides, and phosphates, as measured at a shear rate of 1.0 sec$^{-1}$, at a temperature of 25° C. to 75° C.;
    (b) dissolving about 0.01 to about 0.5 weight percent of a water insoluble neutralized sulfonated polymer in said solvent system to form a first solution, a viscosity of said first solution being less than about 200 cps;

(c) dissolving about 0.01 to about 0.5 weight percent of a copolymer of styrene/vinylpyridine in an organic solvent t form a second solution, said copolymer of styrene/vinylpyridine having about 0.5 to 50.0 weight percent of vinylpyridine, a viscosity of said second solution being less than about 200 cps;

(d) mixing together said first solution and said second solution to form in solution a water insoluble interpolymer complex of said neutralized sulfonated polymer and said copolymer of styrene/vinylpyridine, said first solution and said second solution being mixed in a molar ratio sufficient that the molar ratio of the sulfonate groups of said neutralized sulfonated polymer to the vinyl pyridine groups of said copolymer of styrene/vinylpyridine in said interpolymer complex is about 0.1 to about 20;

(e) adding with mixing about 5 to about 500 volume percent water to said solution of such water insoluble interpolymer complex, said water being immiscible with said solution of said water insoluble interpolymer complex, said polar cosolvent and said water insoluble interpolymer complex transferring from said organic liquid and said organic solvent to said water, causing the viscosity of said water to increase to at least 50 cps, said polar cosolvent being selected from the group consisting of water soluble alcohols, amines, amides, acetamides and phosphates, as measured at a shear rate of 1.0 sec$^{-1}$, at a temperature of 25° C. to 75° C.; and (f) separating by decantation said water containing such polar cosolvent and said water insoluble interpolymer complex from said organic liquid and said aromatic solvent.

2. A process according to claim 1 wherein said neutralized sulfonated polymer has about 10 to about 200 meq. of pendant neutralized sulfonate groups per 100. grams of polymer.

3. A process according to claim 2 wherein said neutralized sulfonate groups are neutralized with an ammonium or metal counterion.

4. A process according to claim 3 wherein said sulfonated groups are neutralized with a counterion being selected from the group consisting of the transition elements of the Periodic Table of Elements, Groups IVA to IIB, scandium, titanium, vanadium, chromium, manganese, iron, cobalt, nickel, copper, mercury, cadmium and zinc.

5. A process according to claim 3 wherein sulfonated groups are neutralized with a counterion being selected from the group consisting of antimony, iron, aluminum, lead and Groups IA and IIA of the Periodic Table of Elements and mixtures thereof.

6. A process according to claim 1 wherein said neutralized sulfonated polymer is formed from an elastomeric polymer.

7. A process according to claim 6 wherein said elastomeric polymer is selected from the group including EPDM terpolymer and thereof Butyl rubber.

8. A process according to claim 1 wherein said neutralized sulfonated polymer is formed from a thermoplastic.

9. A process according to claim 8 wherein said thermoplastic is selected from the group including polystyrene, t-butyl styrene, ethylene/styrene copolymers, propylene/styrene copolymers or styrene/acrylonitrile copolymer.

10. A process according to claim 1 wherein said styrene-4-vinylpyridine copolymer has about 0.1 to 25 mole percent 4-vinylpyridine units.

11. A process according to claim 1 wherein said polar cosolvent is selected from the group including methanol, ethanol, propanol, isopropanol and mixtures thereof.

12. A process according to claim 1 wherein said polar cosolvent has a solubility parameter of at least about 10.

13. A process according to claim 1 wherein said organic liquid is selected from the group including aromatic hydrocarbons, ketones, chlorinated aliphatic hydrocarbons, aliphatic hydrocarbons, cyclic aliphatic ethers, aliphatic ethers or aliphatic esters and mixtures thereof.

14. A process according to claim 1 wherein said organic liquid is selected from the group including aliphatic hydrocarbons or aromatic hydrocarbons.

15. A process according to claim 1 wherein said organic liquid is selected from the group including benzene, toluene, ethyl benzene, xylene or styrene and mixtures thereof.

16. A process according to claim 13 wherein said neutralized sulfonated polymer is formed from polystyrene.

17. The product prepared by the process of claim 1.

* * * * *